(12) United States Patent  
Dent

(10) Patent No.: US 6,185,259 B1  
(45) Date of Patent: Feb. 6, 2001

(54) TRANSMITTER/RECEIVER FOR GMSK AND OFFSET-QAM

(75) Inventor: Paul W. Dent, Pittsboro, NC (US)

(73) Assignee: Ericsson Inc., Research Triangle Park, NC (US)

( * ) Notice: Under 35 U.S.C. 154(b), the term of this patent shall be extended for 0 days.

(21) Appl. No.: 09/066,669

(22) Filed: Apr. 28, 1998

Related U.S. Application Data

(63) Continuation-in-part of application No. 08/662,940, filed on Jun. 12, 1996.

(51) Int. Cl.[7] .................................................. H04L 5/12
(52) U.S. Cl. ........................ 375/261; 375/274; 332/100; 332/103
(58) Field of Search .................................. 375/261, 260, 375/279, 305, 308, 274; 332/100, 103

(56) References Cited

U.S. PATENT DOCUMENTS

| | | | |
|---|---|---|---|
| 4,103,238 | * | 7/1978 | Deming et al. .......................... 375/295 |
| 4,267,591 | | 5/1981 | Wissel et al. . |

(List continued on next page.)

FOREIGN PATENT DOCUMENTS

| | | |
|---|---|---|
| 2092608 | 9/1994 | (CA) . |
| 0382697A2 | 8/1990 | (EP) . |
| 0496152A2 | 7/1992 | (EP) . |
| 0583059A1 | 2/1994 | (EP) . |
| 0637139A1 | 2/1995 | (EP) . |
| 0847169A2 | 6/1998 | (EP) . |
| 97/48219 | 12/1997 | (WO) . |

OTHER PUBLICATIONS

Antonio Gusmao et al., "A Generalized ENCAP–4N Modulation Technique for Digital Radio", Western Union Technical Review, Mar. 1987, pp. 129–133.

(List continued on next page.)

Primary Examiner—Temesghen Ghebretinsae
(74) Attorney, Agent, or Firm—Burns, Doane, Swecker & Mathis L.L.P.

(57) ABSTRACT

A transmitter encodes a number 2N data bits by using N data bits to select one of $2^N$ levels of a cosine wave and the other N data bits to select one of $2^N$ levels of a sine wave. The modulation attains the cosine wave levels at instants offset by half an N-bit symbol interval with respect to the sine wave levels, and is called Offset QAM (OQAM). A received OQAM signal is amplified, filtered and digitized at a sampling rate of preferably only one sample per N-bit half-symbol interval. Successive N-bit half-symbols comprise information modulated alternately on a cosine and a sine carrier wave. The receiver may remove this successive rotation by applying successive derotations of successive digitized samples by like amounts. The derotated samples are then correlated with known sync half-symbols. The sync correlations determine a set of channel coefficients describing the dependence of each digitized sample on one or more unknown half-symbols. The computed channel estimates are then used to predict the expected received sample values for all possible sequences of successive unknown half-symbols that are to be decoded. Received samples are then compared with all possible expected values and a measure of disagreement or error metric computed. That sequence with the lowest cumulative error metric is used to determine the decoded symbol output. In other aspects of the invention, dual mode transmitters and receivers are disclosed that enable different types of modulation to be alternatively utilized in a same apparatus.

25 Claims, 5 Drawing Sheets

U.S. PATENT DOCUMENTS

| | | |
|---|---|---|
| 4,281,412 | 7/1981 | Wissel et al. . |
| 4,485,357 | 11/1984 | Voorman . |
| 4,737,968 | 4/1988 | Norton et al. . |
| 5,093,848 | 3/1992 | Raith . |
| 5,136,616 | 8/1992 | Dent . |
| 5,191,597 | 3/1993 | Ekelund et al. . |
| 5,222,103 | 6/1993 | Gross ................................... 375/330 |
| 5,331,666 | 7/1994 | Dent . |
| 5,335,250 | 8/1994 | Dent et al. . |
| 5,462,355 | 10/1995 | Yowell ................................ 366/343 |
| 5,491,457 | 2/1996 | Feher . |
| 5,491,832 * | 2/1996 | Malkamaki et al. ................. 375/298 |
| 5,557,645 | 9/1996 | Dent . |
| 5,559,788 * | 9/1996 | Zscheile, Jr. et al. ............... 370/203 |
| 5,568,518 | 10/1996 | Dent . |
| 5,577,068 | 11/1996 | Bottomley et al. . |
| 5,577,087 | 11/1996 | Furuya . |
| 5,602,868 * | 2/1997 | Wilson ................................. 375/219 |
| 5,612,651 | 3/1997 | Chethik ............................... 332/103 |
| 5,615,231 | 3/1997 | Dent . |
| 5,619,553 | 4/1997 | Young et al. . |
| 5,629,956 * | 5/1997 | Durrant et al. ...................... 375/208 |
| 5,671,253 | 9/1997 | Stewart . |
| 5,678,183 * | 10/1997 | Uchida et al. ....................... 375/216 |
| 5,694,433 | 12/1997 | Dent .................................... 375/297 |
| 5,784,412 * | 7/1998 | Ichihara .............................. 375/302 |

OTHER PUBLICATIONS

J. J. Poklemba et al., "A Digitally Implemented Modem: Theory and Emulation Results", COMSAT Technical Review, Communications Satellite Corporation, pp. 149–194.

W. J. Weber et al., "A Bandwidth Compressive Modulation System Using Multi–Amplitude Minimum Shift Keying (MAMSK)", IEEE Transactions on Communications, May 1978.

Kawas Kaleh Ghassan, "Differential Detection via the Viterbi Algorithm for Offset Modulation and MSK–Type Signals", IEEE Transactions on Vehicular Technology, Nov. 1992.

H. Wurzburg et al., "Flexible 2400 BPS Modem Allows Embedded Applications", WESCON 88/Conference Record, Nov. 1998.

* cited by examiner

TRANSMITTER/RECEIVER FOR GMSK AND OFFSET-QAM

REFERENCE TO COPENDING APPLICATION

This application is a continuation-in-part of U.S. patent application Ser. No. 08/662,940, filed Jun. 12, 1996 in the name of P. Dent, and entitled "Transmitter for Encoded Data Bits," which application is hereby incorporated herein by reference in its entirety.

BACKGROUND

The present invention relates to demodulation of radio signals modulated with a new, spectrally-efficient type of modulation while compensating for time dispersion caused by multipath propagation in the land-mobile radio environment.

The European digital cellular system known as GSM utilizes a modulation technique known as Gaussian Minimum Shift Keying (GMSK), in which successive binary bits are modulated alternately onto a cosine carrier and a sine carrier respectively while maintaining a constant signal amplitude. A related modulation called Offset-shaped Quadrature Phase Shift Keying ("Offset QPSK" or "OQPSK") provides a very similar signal but does not maintain a constant amplitude. Nevertheless, the similarity between GMSK and OQPSK waveforms is sufficient enough to make it possible for an OQPSK receiver to efficiently demodulate a GMSK signal and vice versa. Cellular telephones conforming to the GSM standard have been marketed and sold throughout the world by L.M. Ericsson since about 1990, and since about 1993 in the U.S.A. where the standard is known as PCS1900. L.M. Ericsson is the Swedish parent company of Ericsson Inc., the current assignee of this application. Ericsson GSM telephones utilize derotation of the received GMSK signal samples by successive multiples of 90 degrees. However, the information symbols that are derotated are symbols representing single binary bits that can take on levels of only +1 or −1, and not the multi-level signals disclosed in this application and its parent application. GSM telephones also employ channel estimation by correlating received signal samples with a known synchronization word ("syncword") and then using the channel estimates in a Viterbi processor to demodulate the received signal while compensating for intersymbol interference (ISI). Indeed, the Viterbi processor is a well known form of equalizer used to compensate for multipath propagation and other causes of ISI, and is described for example in U.S. Pat. Nos.:

5,093,848;

5,136,616;

5,331,666;

5,335,250;

5,577,068;

5,568,518;

5,615,231;

5,557,645; and 5,619,553 which are all hereby incorporated by reference herein.

A related inventive modulation and decoding method therefor is disclosed in U.S. patent application Ser. No. 08/769,263 to P. Dent, filed Dec. 18, 1996 and entitled "Spectrally Efficient Modulation Using Overlapped GMSK", which is also hereby incorporated by reference herein. In overlapped GMSK modulation, the number of data bits transmitted in a given instant and within a given bandwidth is doubled by combining two GMSK signals with a 90 degree relative phase rotation to reduce interference therebetween. In the parent to this application (i.e., U.S. patent application Ser. No. 08/662,940), it is disclosed that two GMSK signals may alternatively be combined with relative amplitude ratio 1:0.5 in order to produce an inventive offset-16QAM modulation.

In the prior art, the number of metric computations performed in a Viterbi equalizer to demodulate each symbol from an alphabet of M symbols is equal to M to the power L, where L is the number of symbols of ISI, that is the number of symbols which affect each received signal sample. In the GSM system, a GMSK symbol may be regarded as having a duration of two bits, but thanks to the one bit or half-symbol offset between the cosine and sine channels, a half-symbol may be regarded as being only one bit duration. By Viterbi processing to demodulate one half-symbol at a time, the GSM telephones therefore reduce complexity by having a sub-alphabet size of only two possible bit values, that is M=2 for GSM equalizers sold by Ericsson.

SUMMARY

It is therefore an object of the present invention to provide communications techniques and apparatus that reduce the number of required metric computations even when higher order constellations such as 16-QAM are used.

This application discloses optimum methods to decode the inventive modulation described in the above-referenced U.S. Pat. No. 5,815,531. More particularly, the invention disclosed herein enables the metric savings to be obtained even when higher order constellations such as 16-QAM are used, by employing the teachings of the parent application to offset the instants at which cosine and sine modulation are applied by half of a 16-QAM symbol duration to produce the inventive 16-OQAM modulation. By processing only a cosine symbol or a sine symbol at a time, the sub-alphabet size is reduced from sixteen possible symbols to four possible symbols, that is, M=4 rather than 16, giving a much lower equalizer complexity than that which is disclosed in the prior art.

In accordance with one aspect of the present invention, an inventive transmitter encodes a number 2N (e.g., 2N=4) data bits by using N (e.g., two) data bits to select one of two to the power N (e.g., four) levels of a cosine wave and the other N data bits to select one of two to the power N levels of a sine wave. In contrast to prior art 16QAM, the inventive modulation attains the cosine wave levels at instants between the instants that the sine wave attains its modulation levels, that is, at instants offset by half a 2N-bit (e.g., 4-bit) symbol interval, the modulation thus being known as Offset QAM or OQAM. A receiver according to the invention receives the OQAM signal and amplifies, filters and digitizes the received signal at a sampling rate of preferably only two samples per 2N-bit symbol interval (i.e., one sample per N-bit half-symbol interval). Successive N-bit half-symbols comprise information modulated alternately on a cosine and a sine carrier wave, that is, successive half-symbols are rotated by 90 degrees. In one embodiment of the inventive modulation, this rotation successively has the values 0,90, 0,90,0,90 . . . and so on, while in an alternative embodiment of the inventive modulation, the successive rotation takes on the values 0,90,180,270,0,90,180,270 . . . and so on, such that successive cosine wave symbols are alternately inverted (0,180,0,180 . . . ) while successive sine wave symbols are likewise alternately inverted (90,270,90,270 . . . ). This alternate inversion of successive cosine and successive sine wave symbols does not change the modulation in principle, and merely requires that the successive inversion be corrected by inverting alternate cosine and sine symbols either before modulation (by use of precoding), or alternatively, after demodulation.

The inventive receiver may optionally remove the successive rotation through 0,90,180,270 . . . degrees by applying successive derotations of successive digitized samples by like amounts. Successive derotations of successive digitized samples are easy to implement by simply swapping the real and imaginary parts of the complex samples and manipulating their signs appropriately. After this derotation, the inventive receiver performs a correlation of the derotated samples with a set of known sync half-symbols to establish a time synchronization marker for demodulating unknown N-bit half-symbols. The sync half-symbols may furthermore be chosen to comprise only two of the $2^N$ possible amplitudes of the sine or cosine wave, such as the two greatest amplitudes of opposite sign, such that the sync symbols are binary symbols, facilitating correlation.

The sync correlations determine a set of channel coefficients describing the dependence of each digitized sample on one or more unknown half-symbols. Dependence of a digitized sample on more than one successive half-symbol may occur for example due to time dispersion or multipath echos in the propagation path, inter-symbol interference (ISI) caused by transmit or receiver filtering, or by the receiver digitizing signal samples at a sampling instant other than that at which the half-symbols are expected to attain their nominal sine or cosine values.

The channel estimates computed using known half-symbols are then used to predict the expected received sample values for all different possible sequences of successive unknown half-symbols that are to be decoded. For example, where N=2, if channel estimation determines that a received sample depends on 3 successive half-symbols, there are 4 cubed=64 possible sequences of 3 successive two-bit half-symbols, and thus 64 possible expected values of which 32 are simply the negatives of the other 32.

Continuing with the example in which N=2, received samples are then compared with all 64 possible expected values and a measure of disagreement or error metric computed. A Viterbi Maximum Likelihood Sequence Estimator ("Viterbi MLSE", or "MLSE") is preferably used to accumulate error metrics to determine that sequence, among all possible sequences, that produces the lowest cumulative error metric. Automatic phase correction and amplitude scaling during Viterbi processing may take place using fast automatic frequency control (AFC) and automatic gain control (AGC) algorithms. The number of metric computations using this inventive 16-OQAM modulation is equal to 4 to the power L, where L is the number of half-symbols on which each digitized sample depends. This is contrasted with 16 to the power L for prior art 16-QAM. The invention may be obviously extended to higher order constellations of OQAM other than 16-OQAM.

In other aspects of the invention, dual mode transmitters and receivers are disclosed that enable different types of modulation to be alternatively utilized. In some embodiments, a communication burst includes unknown as well as known (sync) information symbols, wherein the known sync symbols communicated between the transmitter and the receiver convey information permitting the receiver to determine the type of modulation utilized for transmitting the unknown information symbols. In some embodiments, the known sync information symbols are transmitted by means of only one type of modulation (e.g., GMSK) regardless of the type of modulation applied for transmitting the unknown information symbols.

BRIEF DESCRIPTION OF THE DRAWINGS

The objects and advantages of the invention will be understood by reading the following detailed description in conjunction with the drawings in which.

DETAILED DESCRIPTION

Figure 1A:
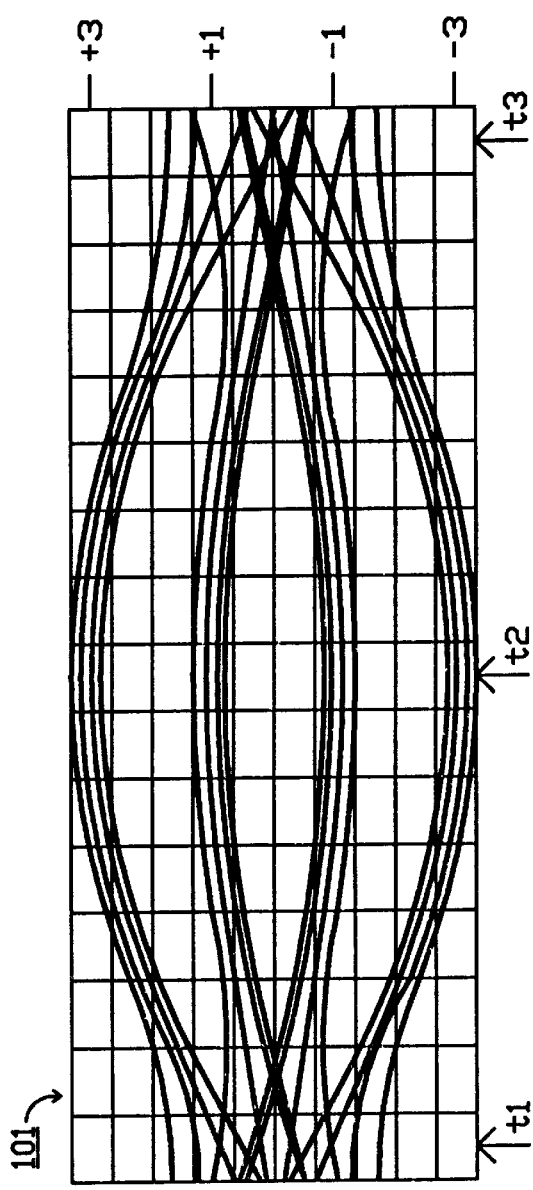
FIGS. 1a and 1b depict respective cosine and sine waveforms of Offset-16QAM modulation according to one aspect of the invention.

The various features of the invention will now be described with respect to the figures, in which like parts are identified with the same reference characters.

Figure 1B:
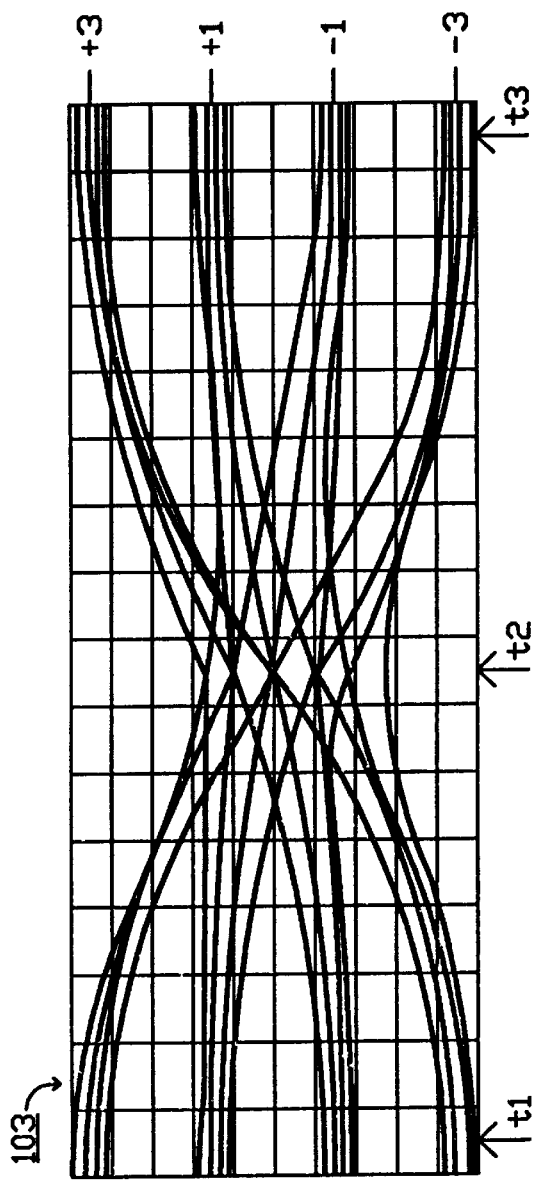

FIGS. 1a and 1b show, respectively, the cosine and sine waveforms 101, 103 of Offset-16QAM modulation according to the invention disclosed in the parent application (U.S. patent application Ser. No. 08/662,940). Each of these waveforms is obtained by adding together two, constant-amplitude, Gaussian Minimum Shift Keying waveforms (GMSK waveforms) with an amplitude ratio of 1:0.5 to produce approximately the four discrete levels on each of a cosine and a sine wave. In the exemplary cosine and sine waveforms 101 and 103, the four discrete levels are, from lowest to highest, −3, −1, +1 and +3. The small spread about each of the four levels indicates an inherent inaccuracy resulting from the use of GMSK signals to approximate the exact offset-16QAM waveforms. This error is small in relation to the efficiency benefit in being able to employ class-C amplifiers for amplifying each of the GMSK signals.

The GMSK waveforms specified for use in the European Digital Cellular system known as GSM are a subset of all the Offset-16-QAM waveforms of FIGS. 1a and 1b, and in particular, are those waveforms that pass through the maximum positive or negative cosine and sine values around +/−3. The GMSK waveforms are obtained by applying the same two data bits to the two GMSK modulators, and the inventive transmitter of the parent application then produces GMSK with the full efficiency of the class-C amplifiers used. This feature, that is being able to produce GMSK waveforms with no loss of efficiency compared to a GMSK transmitter, is useful when it is desired to construct dual-mode transmitters and receivers that can handle prior art GSM-type GMSK modulation as well as the new Offset-16-QAM waveforms.

GSMK signals may alternatively be either differentially or coherently modulated. In the case of differential modulation, each successive information bit initiates either a +90 or a −90 degree signal phase rotation relative to the previous phase. In the alternative case of coherent modulation, the final signal phase after completing a +90 or a −90 degree rotation is directly indicative of a data bit polarity. As is well known from the GSM system, coherent GMSK may be produced by a differential GMSK modulator using suitable precoding of the applied information bitstream. Coherent GMSK provides superior performance and is a preferred, although not essential, form of GMSK herein.

Figure 2:
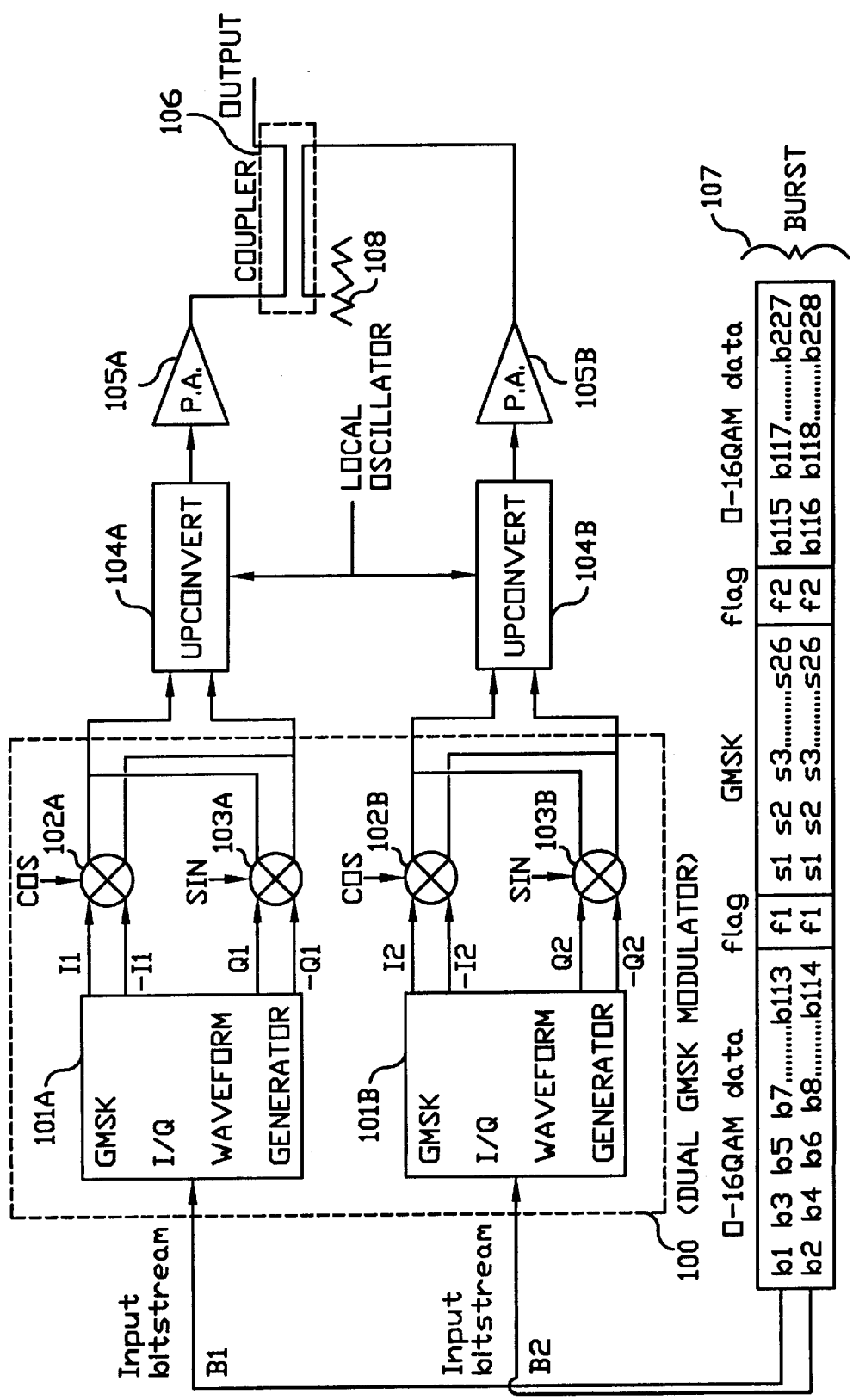
FIG. 2 is a block diagram of an exemplary transmitter arrangement in accordance with one aspect of the invention.

FIG. 2 shows more details of an exemplary transmitter arrangement disclosed in the above-referenced U.S. Pat. No. 5,815,531. A dual, GMSK modulator 100 (or alternatively, an OQPSK modulator, if power amplifiers 105A, 105B are linear power amplifiers) accepts a first input bitstream B1 and a second input bitstream B2 and produces modulated output signals. It is common practice first to produce the modulated signals at a fixed transmit intermediate frequency (TXIF) and then to use upconvertors 104A, 104B to upconvert the modulated signals to the final transmit frequency with the aid of a local oscillator which may be tuned to vary the transmit frequency channel. U.S. Pat. No. 5,530,722 to P. Dent ('722) discloses improved quadrature modulators, also known as I/Q modulators, which are suitable for producing GMSK or OQPSK modulated signals. The above-referenced '722 patent is hereby incorporated by reference herein. Other methods of producing GMSK signals may be used however, including direct modulation of a fractional-N synthesizer with the data bitstream. The upconvertors 104A, 104B can be one of two alternative types, depending on whether the dual GMSK modulator 100 produces only constant envelope signals (like GMSK) or variable amplitude signals (such as OQPSK). In the latter case, the amplitude variation must be preserved through the upconversion process, so a suitable upconvertor is a heterodyne mixer to mix the modulated TXIF signal with the local oscillator signal. The mixer will usually produce both a sum and a difference frequency output, necessitating a bandpass filter to select the desired frequency output (i.e., the sum or the difference).

If, however, the dual GMSK modulator 100 produces only constant envelope signals, another type of upconvertor may be used which avoids the need for a bandpass filter to select the desired output. In this case, a voltage-controlled transmit frequency oscillator (TX VCO) is mixed with the local oscillator signal to produce a TXIF signal. This TXIF signal is phase compared with the modulated TXIF signal from the modulator (e.g., the signal generated by the GMSK I/Q waveform generator 101a in combination with the mixers 102A and 103A, as shown in FIG. 2) to obtain a phase error signal. The phase error signal is filtered using a loop filter including an integrator to produce a voltage control signal for the TX VCO, forming a phase-lock loop which forces the TX,VCO phase to follow the modulation phase. This second type of upconvertor is preferred when both modulators (101A, 102A, 103A) and (101B, 102B, 103B) produce GMSK signals.

The upconverted signals at the respective outputs of the upconvertors 104A, 104B drive respective ones of the power amplifiers 105A, 105B. The two power amplifiers 105A, 105B have unequal output powers in the ratio 2:1. That is, a first power amplifier 105A can, for example, produce an output power of 1.5 watts while a second power amplifier 105B produces an output power of 0.75 watts. The power amplifier output signals are combined using a directional coupler 106 which has a first voltage coupling ratio k from the second power amplifier 105B to the output and a second coupling ratio $\sqrt{(1-k^2)}$ from the first power amplifier 105A to the output. The sum of the squares of the coupling ratios is always unity for a "lossless" directional coupler. Choosing the ratio of the second to the first coupling factors to equal the power amplifier power ratio of 2:1 results in the power amplifier output powers adding at the output when both power amplifiers are producing the same signal, that is, when bitstreams B1 and B2 are identical, thus giving a peak output power of 1.5+0.75=2.25 watts. In this condition, no power is dissipated in the dummy load 108 connected to the unused port of the directional coupler 106. When bitstreams B1 and B2 are not identical, the output is not the sum of the power amplifier powers, but is instead a variable amplitude waveform as shown in FIGS. 1a and 1b. FIGS. 1a and 1b illustrate the O-16QAM waveforms produced when half the data bits to be transmitted are used to form bitstream B1 and the other half are used to form bitstream B2. When the sum of the squares of the cosine and sine waveforms is less than the maximum value corresponding to 2.25 watts output power, the remaining power not output is dissipated in the dummy load 108 attached to the unused output of directional coupler 106. Thus, full output power, constant-envelope GMSK modulated signals may be produced by feeding the two modulators with identical bitstreams, as occurs during transmission of those parts of the data burst 107 of FIG. 2 labeled "syncword" and "flag". Alternatively, variable amplitude O-16QAM signals are produced when bitstreams B1 and B2 consist of different bits, as during the portion of the burst 107 labeled "O-16QAM DATA" in FIG. 2. When the directional coupler 106 is a 90-degree coupler, it is necessary to provide a compensating 90 degree phase shift of the power amplifier drive signals. This can be easily arranged by resetting the starting phase of the two GMSK modulators to be 90-degrees apart, or alternatively by providing a quarter-wave transmission line or lumped circuit equivalent between the output of one upconvertor and the power amplifier it drives.

FIGS. 1a and 1b illustrate those points at which a receiver would ideally sample the cosine and sine waveforms 101, 103. As illustrated, the optimum sampling points t1, t2, t3 are spaced by half a 4-bit symbol period apart. At odd sampling instants t1 and t3, the sine waveform 103 attains its constellation values most accurately, allowing two of the four data bits (such as b5,b6 in the burst 107 of FIG. 2) to be decoded, while the cosine wave 101 attains its constellation values at even sampling instants such as t2, allowing another two data bits to be decoded (such as b7,b8 in the burst 107 of FIG. 2), thus decoding four data bits in one symbol period with the aid of two, half-symbol-spaced samples.

In practice, multipath propagation and other of the above-mentioned transmission imperfections do not yield the ideal waveforms 101, 103 of FIGS. 1a and 1b at the receiver. For example, if the waveforms are mis-sampled so that the even and odd sampling instants are confused, the sine wave 103 sampled at t2 would not attain one of four distinct levels but one of approximately six, with these six levels being produced as a function of the foregoing two data bits and the following two data bits modulated on the sine wave. Thus it can arise, due to multipath propagation (delayed signal echos), mis-sampling or other timing distortions such as group delay distortion in the receiver filter, that the received waveform samples depend on more than one successive pair of data bits. As a first step in decoding a received waveform corrupted by such Inter-symbol Interference (ISI), it is useful to determine the dependence of each sample on the surrounding data bits. This is termed "channel estimation" and is performed for example by correlating received samples with a known symbol pattern embedded in the transmission.

Figure 3:
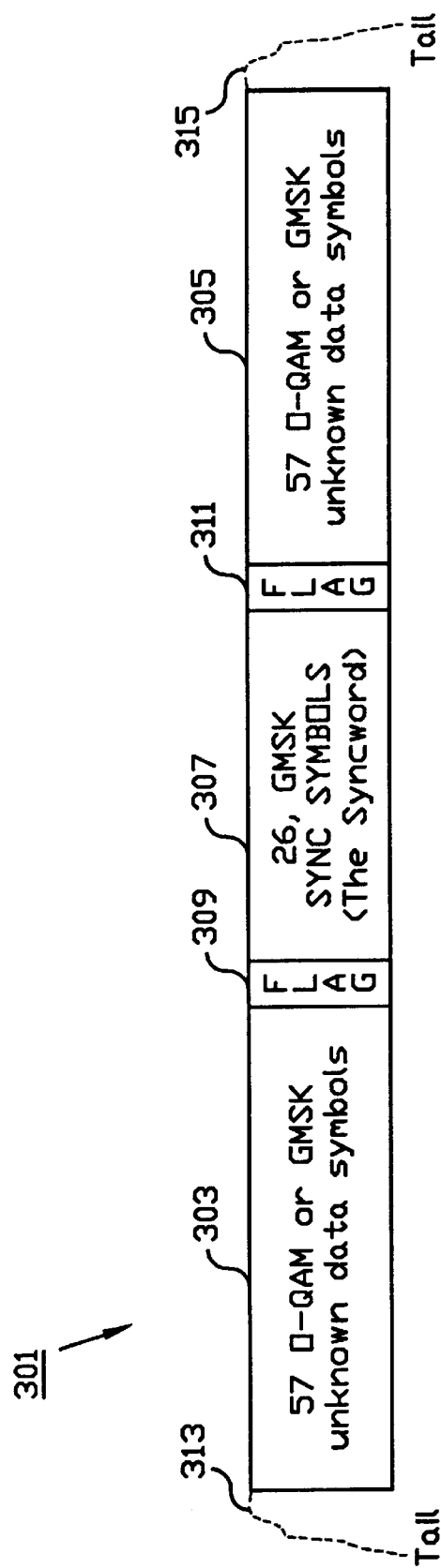
FIG. 3 is a diagram of a Time Division Multiple Access (TDMA) burst format in accordance with one aspect of the invention.

FIG. 3 shows a Time Division Multiple Access (TDMA) burst format 301 which conforms approximately to the GSM format, except that the unknown symbols 303, 305 are O-16QAM symbols as in FIG. 1, while the known 26-bit syncword 307 is a GSM syncword of GMSK symbols, which are simply a subset of the O-16QAM symbols and can be produced by the same transmitter simply by choosing the data bits fed to it. The 26-bit syncword 307 is centrally placed within the burst format 301 in order to reduce the maximum distance between known symbols and unknown symbols. Channel estimates computed from the known syncword 307 are then valid for decoding unknown symbols 303, 305 over the whole burst, as the signal propagation path does not vary significantly from the center to the edge of the burst 307 providing the relative velocity between the receiver and transmitter does not exceed normal automobile speeds.

In GSM, the central syncword is bordered by two "flag" bits 309, 311. The flag bits 309, 311 indicate whether an 8-burst interval contains a block of digitized speech or user data, or alternatively a Fast Associated Control Channel (FACCH) message. FACCH messages are sent when the transmitter desires to alter the operation at the receiver, for example to cause a handover from one serving base station to another serving base station, or to cause a change from voice to data traffic. With the introduction of Offset 16-QAM, the opportunity arises to use O-16QAM half-symbols for the flags, and thus to signal one of four different conditions to the receiver, which for example could comprise:

FLAG SYMBOLS=+3: Burst contains GMSK traffic symbols

FLAG SYMBOLS=−3: Burst contains GMSK FACCH symbols

FLAG SYMBOLS=+1: Burst contains O-16QAM traffic symbols

FLAG SYMBOLS=−1: Burst contains O-16QAM FACCH symbols

However, there is a disadvantage in allowing the FLAG symbols to take on O-16QAM symbol values: Since it would not be known in advance of decoding the flag symbols of 8 consecutive bursts whether the burst contained GMSK or O-16QAM symbols, the bursts would have to be decoded with the assumption that they contained O-16QAM symbols, which produces a higher symbol error rate for GMSK symbols than with a demodulator optimized for only GMSK symbols. This could be overcome at a penalty of greater demodulator complexity by demodulating every burst using both a demodulator optimized for O-16QAM and a demodulator optimized for GMSK, and then using the decoded flag bits to select the output of the one or the other.

To avoid the above disadvantages, it may be preferred to allow the FLAG symbols to remain as GMSK symbols (single binary bits) and to use another method to inform the demodulator whether the unknown symbols are O-16QAM or GMSK symbols. For example, two different, mutually orthogonal syncwords could be used for GMSK and O-16QAM transmissions, respectively. The receiver could relatively easily perform sync correlation (channel estimation) using both syncwords, and use that syncword which gives highest correlations as an indication of whether an O-16QAM or a GMSK demodulator will be used for that burst. In this way, a communications system can be built which can change at will from GMSK to O-16QAM modulation without informing the receiver in advance. Moreover, the inventive transmitter of the parent application can be fed with data which will result in GMSK transmissions or in O-16QAM transmissions without being re-adapted in advance.

Demodulation of GMSK or the linear equivalent modulation OQPSK using channel estimates to adapt a Viterbi Maximum Likelihood Sequence Estimator (MLSE) to compensate for multipath propagation is known from the above-incorporated documents. A method adapted to the inventive O-16QAM modulation will now be described with reference to FIG. 4.

The received signal is sampled at two samples per 16QAM symbol, that is one sample per half-symbol clock period. The signal samples are digitized and stored in receive sample buffer memory 10, using for example the logpolar digitizing technique of U.S. Pat. No. 5,048,059 to P. Dent, which is hereby incorporated by reference herein. Alternatively, a homodyne digitization technique can be used, with DC offset, slope and drift compensation, such as described in U.S. Pat. Nos. 5,241,702 and 5,568,520, both of which are hereby incorporated by reference herein. The digitized sample comprises complex numbers in either logpolar form or Cartesian form, but the complex numbers may readily be converted from one form to another by straightforward mathematical operations. Logpolar form tends to be more convenient for adjusting the overall amplitude (AGC) of the captured burst of signal samples or for removing a systematic frequency error (AFC), as described in above-incorporated U.S. Pat. Nos. 5,568,518 and 5,615,231, while Cartesian form is more usually used for the metric calculations described below. As part of the AFC process, which involves phase angle rotations, received signal samples may be prerotated through successive increments of 90 degrees such that even-numbered samples are changed in phase by + or −90 degrees relative to odd samples, which results in all half-symbols then lying along the same line on the Argand diagram (the complex plane) at an angle depending on total propagation path phase shift. To coherently demodulate this signal, the angle of the line must be determined by using the known syncword symbols in a process known as channel estimation.

Figure 4A:
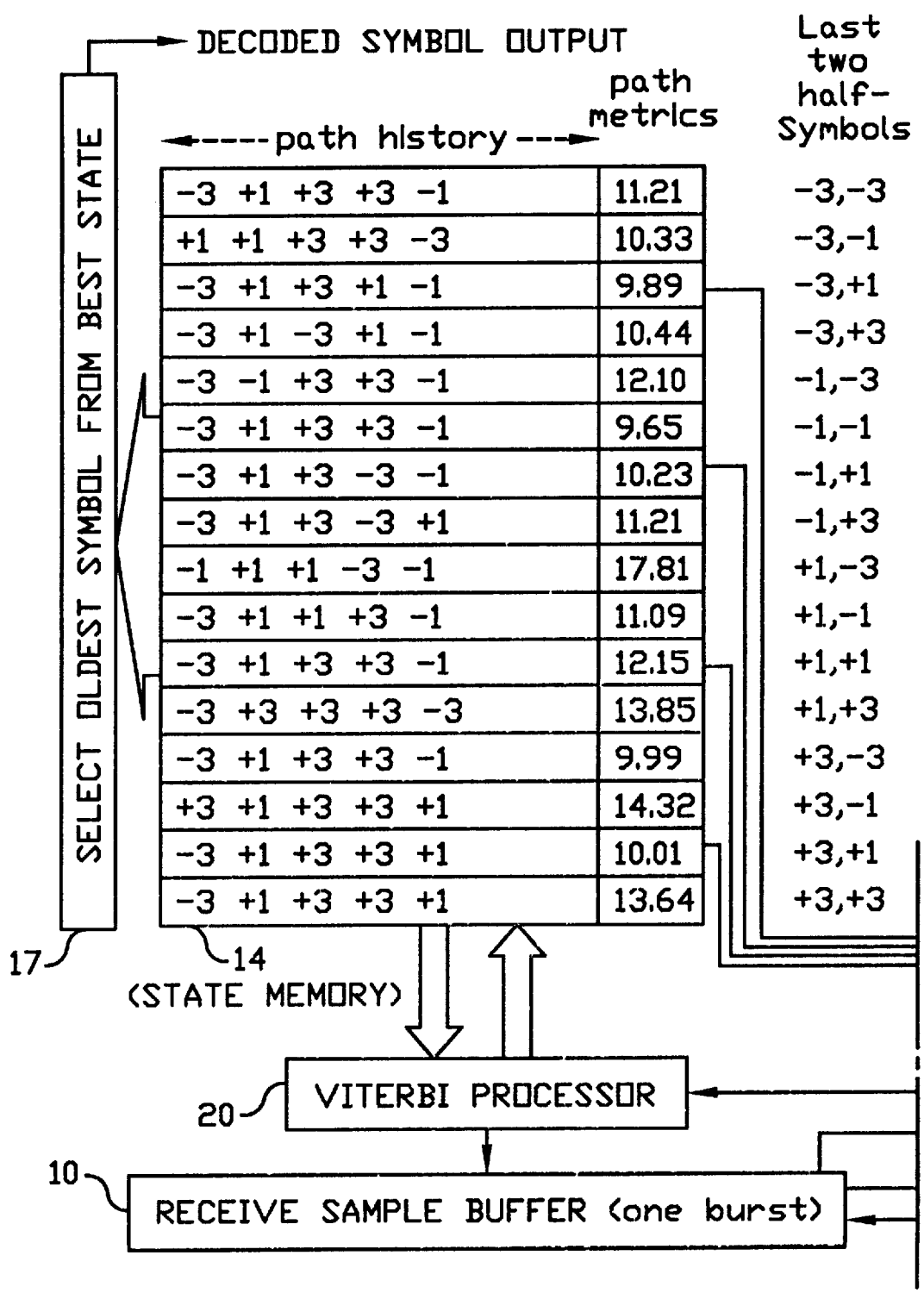
FIG. 4 depicts hardware and steps for receiving an O-16QAM modulated signal in accordance with other aspects of the invention.
Figure 4B:
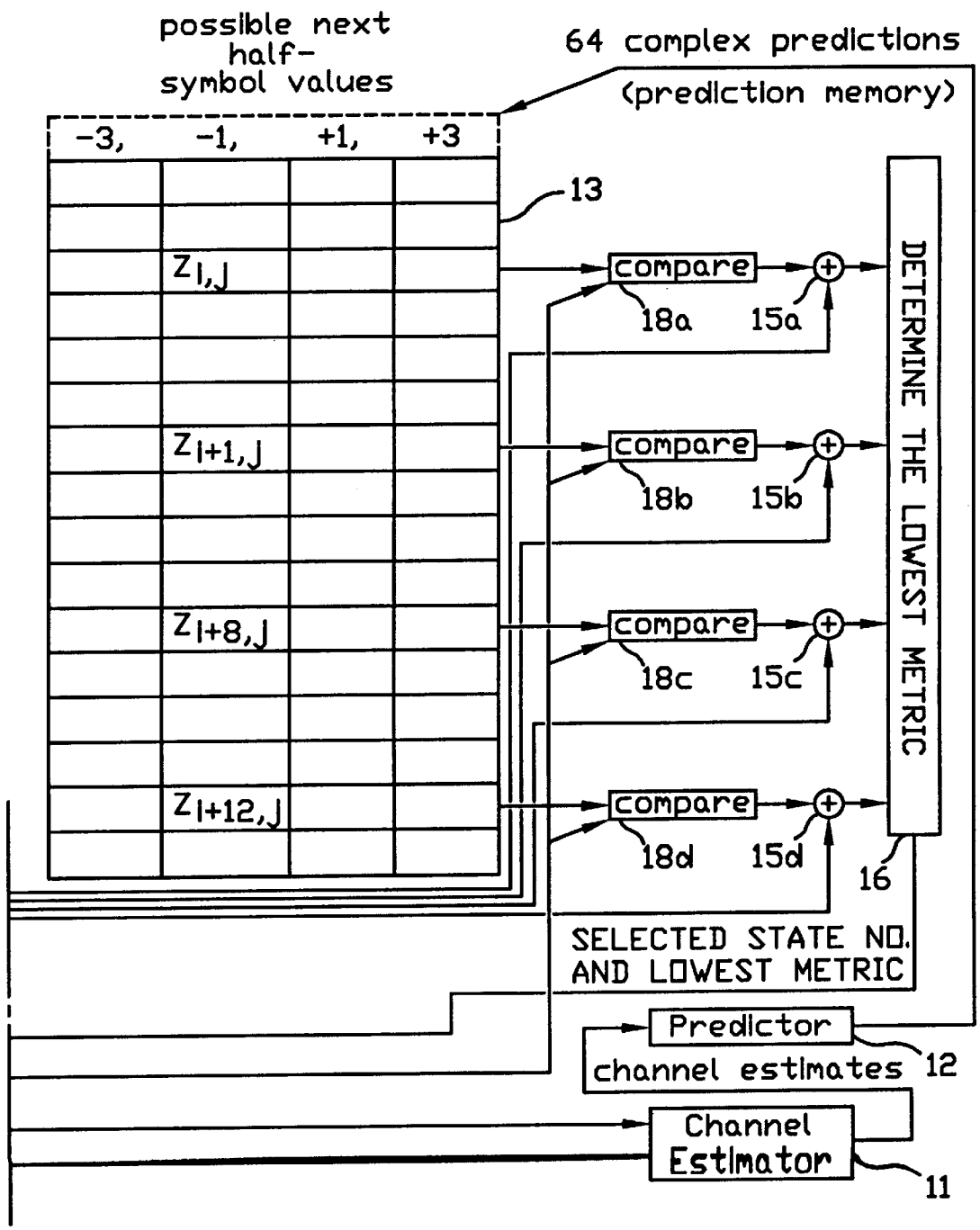

Having captured and digitized the burst and applied AGC and AFC, the channel estimator 11 reads samples from buffer 10 that are located around the expected position of the syncword and determines the magnitude and phase of the received signal and its significant delayed echos by either correlation with the known syncword or by least-squares solution of an overdimensioned set of equations, as described in above-incorporated U.S. Pat. Nos. 5,557,645 and 5,619,533. Channel estimation may indeed be performed using two syncwords, and using that syncword that gives the largest estimate of total signal energy as an indication to the receiver whether the unknown symbols are GMSK or O-16QAM symbols. Assuming that O-16QAM symbols are indicated, the channel estimates are passed to a predictor 12 which predicts the complex signal value expected for every possible combination of L successive O16QAM half-symbols. In the example of FIG. 4, a value of L=3 is illustrated. The three successive half-symbols comprise two "previous" half-symbols and one "new" half-symbol, which together can take on 4×4×4=64 possibilities. Thus, prediction memory 13 receives 64 complex values from predictor 12 and stores them. There are many symmetries that can be exploited to simplify predictor 12. For example, half the values are simply the negatives of the other half, so only 32 distinct values need be computed. Also, those values associated with half-symbol sequences containing values of only +3 or −3 are simply three times the values associated with half-symbol sequences containing only +1 or −1. In addition, a fast method of computing all predictions, starting with at least one already computed value, is to compute the remainder in Grey-code order in which only one half-symbol at a time is changed so as to successively generate all required predictions using only one addition or subtraction of a channel estimate from a previous prediction. For example, if the three channel estimates computed by channel estimator 11 are denoted by C1, C2 and C3, then a predicted received value for the half-symbol sequence S1,S2,S3 is simply $$P(S1,S2,S3)=C1.S1+C2.S2+C3.S3$$

If S1=−3, S2=−3 and S3=+1, we obtain −3C1−3C2+C3 for the prediction to be stored in row 1, column 3 of prediction memory 13. Then, the value to be stored in row 9, column 3 for the symbols +1,−3,+1 is $$P(+1,-3,+1)=C1-3C2+C3$$

which is equal to $$P(-3,-3,+1)+4C1$$

Thus P(+1,−3,+1) can be derived by adding 4C1 to already computed P(−3,−3,+1) and the factor of 4 multiplying C1 is not counted as an arithmetic operation because it can be implemented by a simple left shift of two places of the binary values of C1. P(+3,−3,+1) can then be computed by a further addition of 2C1, and P(+3,−3,+3) can be computed by a further addition of 2C3. Thus it can be seen that the predictions can be computed using much less than 64 times (4 additions plus 4 multiplications)

and more in the order of 32 additions, a saving of 8 to 16 times in effort.

The 64 predictions comprise a row of four values, corresponding to each of the four possibilities of the new half-symbol, associated with each of the 16 possible combinations of the two last half-symbols. In addition there is associated with each of the 16 last-symbol pairs a path history and a path metric, which together form a state memory 14 having 16 rows.

The path metric values in state memory 14 are an inverse measure of the likelihood that the symbols in the path history are correct. The inverse likelihood measure usually represents minus the logarithm of the likelihood, which is a positive number because likelihood or probability is always less than unity and its logarithm is thus negative. The higher the path metric value, the lower the likelihood, and the purpose of the controlling Viterbi processor 20 is thus to control the sequence of calculations until the half-symbol sequence giving the smallest path metric, and thus highest likelihood of being correct, is identified, thereby producing a "best" decoding of the received signal. This is achieved in the following way:

Starting with received samples adjacent to the known syncword 307 and progressing either to the left or to the right in the signal burst 301 of FIG. 3, a received signal sample is extracted from buffer memory 10 and used in four comparison operations indicated by four comparators 18a, 18b, 18c, 18d. The extracted value is compared with four prediction values associated with the same new half-symbol and the same previous half-symbol, but differing older half-symbols. FIG. 4 illustrates the four comparisons with predicted values associated with the half-symbol sequences

−3,+1,−1
−1,+1,−1
+1,+1,−1 and

+3,+1,−1

If Z(i,j) denotes the prediction stored in row(i), columns) of the prediction memory 13, then the receive signal sample is compared with Z(i,j), Z(i+4,j), Z(i+8,j) and Z(i+12,j) to produce four delta-metrics, which are defined as the square of the modulus of the complex difference between the received sample and the compared value, i.e.

$$\text{Delta-metric}=|R-Zij|^2$$

where R is the received sample value and Zij is a precomputed prediction value.

Next, the just-computed delta-metrics are added (in addition operations represented by the adders 15a, 15b, 15c, 15d) to the path metrics from corresponding rows of the state memory 14 (in FIG. 4, the values 9.89, 10.23, 12.15 and 10.01 respectively) in order to obtain four new path metrics. Block 16 identifies the lowest of the four new path metrics and the row in the state memory 14 giving rise to it. The result of block 16 is used by Viterbi processor 20 to generate a new state memory row corresponding to the last half-symbol and the new symbol. In the present example, this is a row for the two last half-symbols equal to +1,−1. This does not yet overwrite the old row (+1,−1) which is still needed for processing. In practice, two state memories 14 may be used, one to contain previous path history and path metrics, and another to receive new path history and path metrics. In embodiments employing two state memories 14, the use of one or the other of the state memories 14 is alternated on successive cycles of the machine. The Viterbi processor 20 also selects the path history of the state indicated by lowest metric from block 16 to become the path history of new state (+1,−1), appending the older of the two last symbols from the selected predecessor state to the path history to record which state gave rise to the lowest metric.

When the above procedure is repeated for all hypotheses of the new half-symbol combined with all values of the immediately preceding half-symbol, 16 new states will have been generated in state memory 14 and the path histories of each state will have been lengthened by appending one extra symbol of path history. To avoid the path history becoming too long, the oldest half-symbol in the path history (e.g., at the left hand edge of the state memory 14 depicted in FIG. 4) is selected by selector 17 from the state/row having the lowest cumulative path metric, and the selected symbol is the finally decoded output for that symbol. Following selection by selector 17, the path histories are shortened by one. It is not always necessary to truncate the path history length to save memory. With only 58 values including the flag bits to decode from the burst format 301 of FIG. 3, a path history memory to store all 58 values times 16 rows is not large by today's standards. At the end of processing, signal samples corresponding to the "tail" 313, 315 indicated in FIG. 3 are processed to flush through the "last two half-symbols" into the path history portion of the state memory 14. The path history associated with the lowest path metric is then selected to yield the 57 decoded O-16QAM values and the flag bit 309 or 311 from one side of the syncword 307. The procedure is then repeated for the 58 values lying on the other side of the sync word 307.

Terminating decoding gives best results when the transmitted "tail" symbols 313, 315 are known values. For example, tail symbols transmitted can be +3 followed by +1, representing a tailing off of the signal burst amplitude prior to any additional power down-ramping. Such controlled down-ramping of transmission power helps to reduce unwanted spectral spreading of the signal into adjacent frequency channels.

When known tail half-symbols are transmitted, not all values of the new symbol have to be hypothesized when processing tail samples. The number of new states generated thus drops from 16 to four upon processing the penultimate tail sample, and from four to one upon processing the final tail sample. Thus, only one state remains containing the 58 decoded values without having to determine the lowest of 16 metrics.

Initializing decoding is also best performed by starting with a single state defined by the last two known half-symbols of the syncword 307, for example state (+3,−3) if the two edge bits of the syncword 307 are the GMSK symbol values of (+3,−3). Then, upon hypothesizing the flag half-symbol 309 or 311, which may also be restricted to one of two GMSK or OQPSK symbol values, the number of states expands to two. After hypothesizing the first new O-16QAM symbol, the number of states expands to 8, and then 16 after hypothesizing the second unknown O-16QAM half-symbol, and then remains at 16 until the number of states contracts upon processing tail samples 313, 315.

The above description, read in conjunction with FIG. 4, concerned an equalizer for decoding signal samples that depend principally on L=3 consecutive O-16QAM half-symbols. The number of states needed was $$4^{(L-1)}=16,$$

for L=3

Such an equalizer can handle delayed echos of about one or two half-symbols delay, or 4–8 microseconds in the case of the GSM sample clock rate of 270.833 KHz. More multipath propagation delay can be handled by increasing the number of states in the state memory 14 so that samples depending on more than three half-symbols can be processed. A person skilled in the art can also adapt the above teachings to make demodulators for higher order constellations than offset-16QAM, such as O-64QAM or O-256QAM with corresponding increase in states to $$8^{(L-1)} \text{ or}$$
$$16^{(L-1)}$$

respectively, where L is the number of half-symbols on which each received signals sample depends due to ISI in the propagation path from transmitter to receiver. The use of the inventive Offset-QAM modulation has resulted in an MLSE demodulator having a number of states which is only the square root of the QAM constellation size raised to a power, allowing lower receiver complexity than prior art equalizers for non-offset QAM that have complexities proportional to the constellation size raised to a power.

In a prior art apparatus designed to receive and equalize GMSK signals, such as a mobile phone designed to operate according to the European GSM standards or the U.S. PCS1900 standard, a 16-state equalizer is also commonly used. Because the GMSK half-symbols are only binary bits that can take on only one of two values (e.g., the +3 or −3 values), the sixteen states of the prior art equalizer are associated with four previous bits instead of two previous bit-pairs as in the O-16QAM case; however it is evident that, thus far, the two equalizers are equivalent. When a new half-symbol is postulated in the GMSK case, it can take on only the +3 or −3 values, so that only two columns of prediction memory 13 are needed. Moreover, for GMSK, only two rows of the state memory 14 are candidate predecessors to a successor state, so only two of the comparisons 18a, 18b, 18c, 18d are needed. The two comparisons are made with only Z(i,j) and Z(i+8,j) to obtain successor state(i). Thus it is evident that an equalizer having 16 states can be adapted to equalize received samples that either depend on three successive O-16QAM half-symbols or alternatively on five consecutive GMSK bits, which allows a dual mode digital cellular phone that can receive either GMSK or O-16QAM to be economically produced.

The equalizer or dual-mode equalizer according to the above invention may also output "soft" decisions instead of "hard" decisions. Soft decisions are better for use in subsequent error correction decoding because they indicate not only the likely value of a symbol but also its reliability. U.S. Pat. No. 5,099,499 to Hammar describes how the path history memory of state memory 14 can store a history of the metric comparisons used to compute the associated cumulative metric as a measure of bit reliability in a GMSK equalizer. The above-identified Hammar patent is hereby incorporated by reference herein. Soft decisions may also be computed for each bit of an O-16QAM half-symbol using the results of comparisons 18a, 18b, 18c, 18d shown in FIG. 4, and like Hammar, may be recorded in the path-history portion of the state memory 14 instead of hard decisions.

Other variations, such as blind equalization in which no known sync symbols are used, or channel tracking equalizers that update the channel estimates or prediction values to compensate for transmitter-receiver relative velocity, may be made by combining the above teachings with those of the incorporated art. All such variations remain within the scope and spirit of this invention as described by the attached claims.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A communications method for transmitting information bits from a transmitter to a receiver comprising the steps of:
   assembling the information bits into N-bit groups of bits to form half-symbols;
   encoding even numbered ones of said half-symbols into one of two to the power N possible amplitude levels of a cosine wave at even instants of a half-symbol clock and odd numbered ones of said half-symbols into one of the same number of amplitude levels of a sine wave at odd instants of said half-symbol clock;
   using said cosine and sine waves together to form complex symbols for transmission, each complex symbol carrying 2N information bits;
   transmitting said complex symbols as a transmission signal on a designated frequency channel to a receiver;
   receiving said transmission signal on said designated frequency channel and converting said received transmission signal to representative complex numerical values at a sampling rate of one complex sample per half-symbol interval; and forming a set of prerotated samples from said representative complex numerical values by rotating alternate ones of said representative complex numerical values by plus or minus 90 degrees in phase angle relative to the representative complex numerical values in between the alternate ones of the representative complex numerical values;

processing said prerotated samples to recover said information bits.

2. The method of claim 1, further comprising the step of forming the transmission signal by using filtering to smooth transitions between said amplitude levels of the cosine and sine waves.

3. A method for transmitting information bits from a transmitter to a receiver including the steps of:

assembling said information bits into N-bit groups of bits to form half-symbols;

encoding even numbered ones of the half-symbols into one of two to the power N possible amplitude levels of a cosine wave at even instants of a half-symbol clock and odd numbered ones of said half-symbols into one of the same number of amplitude levels of a sine wave at odd instants of said half-symbol clock;

using said cosine and sine waves together to form complex symbols for transmission, each complex symbol carrying 2N information bits; and transmitting said complex symbols to the receiver in a transmission signal that conveys the half-symbols interleaved with other half-symbols that are known to the receiver in advance.

4. The method of claim 3, further comprising the step of forming the transmission signal by using filtering to smooth transitions between said amplitude levels of the cosine and sine waves.

5. The method of claim 3 in which said known half-symbols are encoded into only two of the two to the power N possible amplitude levels of said cosine and sine waves.

6. The method of claim 5 in which said known half-symbols are encoded into only the greatest positive or the greatest negative amplitude levels of said cosine and sine waves.

7. A method of transmitting information bits to a receiver at either a first information rate or a second information rate, comprising the steps of:

assembling said information bits into groups of unknown half-symbols, each containing a first number N1 of information bits when transmission at said first information rate is desired, and alternatively containing a second number N2 of information bits when transmission at said second information rate is desired;

encoding even numbered ones of the unknown half-symbols into one of two to the power N possible amplitude levels of a cosine wave at even instants of a half-symbol clock and odd numbered ones of said unknown half-symbols into one of the same number of amplitude levels of a sine wave at odd instants of said half-symbol clock, wherein N=N1 when transmission at said first information rate is desired, and N=N2 when transmission at said second information rate is desired;

using said cosine and sine waves together to form complex symbols for transmission, each complex symbol carrying 2N information bits; and transmitting said complex symbols to the receiver in a transmission signal that conveys the unknown half-symbols interleaved with other half-symbols that are known to the receiver in advance, wherein the other half-symbols each comprise a number N3 of information bits known to the receiver, wherein further N3 may alternatively be equal to N1 or N2 independently of whether transmission at said first or second information rate is desired.

8. The method of claim 7, further comprising the step of forming the transmission signal by using filtering to smooth transitions between said amplitude levels of the cosine and sine waves.

9. The method of claim 7, wherein the other half-symbols that are known to the receiver in advance each comprise N1 information bits known to the receiver, while the unknown half-symbols each comprise N2 information bits.

10. The method of claim 9 wherein said first number N1 equals one.

11. The method of claim 10, wherein said second number N2 equals two.

12. The method of claim 9, wherein said second number N2 equals two.

13. The method of claim 7, wherein said first number N1 equals one.

14. The method of claim 13, wherein said second Number N2 equals two.

15. The method of claim 7, wherein said second number N2 equals two.

16. A method of transmitting information bits to a receiver at either a first information rate or a second information rate, comprising the steps of:

applying the same information bits to a first and a second modulator when transmission at said first information rate is desired, and alternatively applying half of the information bits to said first modulator and the other half to said second modulator when transmission at said second information rate is desired, thereby producing a first and a second modulated signal; and combining said first and said second modulated signals using respective first and second weighting factors to produce a signal for transmission.

17. The method of claim 16, wherein said first information rate is selected during transmission of bits known in advance to said receiver, and said second information rate is used during transmission of bits unknown in advance to said receiver.

18. The method of claim 16, wherein said first and second modulators each modulate the applied information bits using Gaussian Minimum Shift Keying (GMSK).

19. The method of claim 16, wherein said weighting factors are in a 2:1 ratio relative to each other.

20. The method of claim 17, wherein known symbols form an equalizer training sequence for adapting said receiver to compensate for inter-symbol interference.

21. The method of claim 17, wherein known symbols alternatively comprise a first known symbol pattern when said first information rate is used, and a second known symbol pattern when said second information rate is used.

22. The method of claim 21, wherein said receiver detects which of said first or said second known symbol patterns was transmitted and adapts itself to decode information at said first information rate or said second information rate accordingly.

23. A transmitter for transmitting information alternatively using either Gaussian Minimum Shift Keying (GMSK) modulation or Offset Quadrature Amplitude Modulation (OQAM), comprising:

at least two GMSK modulation means having inputs for associated binary information bit streams and providing corresponding modulated output signals;

amplifying and combining means for amplifying each of said modulated output signals and combining the amplified signals in predetermined amplitude ratios;

control means for selecting said associated binary information bitstreams supplied to said at least two GMSK modulation means to all be identical to one another when said GMSK modulation is desired, and alternatively for selecting at least two of said binary information bitstreams supplied to said at least two GMSK modulation means to be different from one another when said OQAM modulation is desired.

24. The transmitter of claim 23, wherein said amplifying means are saturated power amplifiers.

25. The transmitter of claim 23, wherein said combining means is a directional coupler.

* * * * *

UNITED STATES PATENT AND TRADEMARK OFFICE
CERTIFICATE OF CORRECTION

PATENT NO. : 6,185,259 B1
DATED : February 6, 2001
INVENTOR(S) : Paul W. Dent

It is certified that error appears in the above-identified patent and that said Letters Patent is hereby corrected as shown below:

Column 14,
Line 59, after "information" insert -- rate --.

Signed and Sealed this

Twenty-first Day of August, 2001

Attest:

*Attesting Officer*

NICHOLAS P. GODICI
*Acting Director of the United States Patent and Trademark Office*